US 9,081,656 B2

(12) United States Patent
Yingling, Jr. et al.

(10) Patent No.: US 9,081,656 B2
(45) Date of Patent: Jul. 14, 2015

(54) METHODS AND SYSTEMS FOR PREDICTING A FAULT

(75) Inventors: Harold R. Yingling, Jr., Swansboro, NC (US); Cynthia Hill Evans, Lexington, SC (US); Larry D. Bass, Lexington, SC (US)

(73) Assignee: NCR Corporation, Duluth, GA (US)

( * ) Notice: Subject to any disclaimer, the term of this patent is extended or adjusted under 35 U.S.C. 154(b) by 266 days.

(21) Appl. No.: 13/330,847

(22) Filed: Dec. 20, 2011

(65) Prior Publication Data

US 2013/0159787 A1 Jun. 20, 2013

(51) Int. Cl.
*G06F 11/00* (2006.01)

(52) U.S. Cl.
CPC .................................. *G06F 11/008* (2013.01)

(58) Field of Classification Search
USPC ............................................ 714/47.3, 25, 48
See application file for complete search history.

(56) References Cited

U.S. PATENT DOCUMENTS

| 5,629,871 | A | 5/1997 | Love et al. |
| 5,828,583 | A | 10/1998 | Bush et al. |
| 6,212,256 | B1 | 4/2001 | Miesbauer et al. |
| 6,782,345 | B1 | 8/2004 | Siegel et al. |
| 7,089,154 | B2 * | 8/2006 | Rasmussen et al. ........... 702/183 |
| 2001/0031036 | A1 | 10/2001 | Berezowitz et al. |
| 2004/0049715 | A1 * | 3/2004 | Jaw .................. 714/43 |
| 2005/0005190 | A1 * | 1/2005 | Ofir et al. ............. 714/4 |
| 2006/0131380 | A1 | 6/2006 | Forrest et al. |
| 2007/0055914 | A1 * | 3/2007 | Chandwani et al. ............ 714/47 |
| 2007/0088974 | A1 * | 4/2007 | Chandwani et al. ............. 714/6 |
| 2007/0292145 | A1 | 12/2007 | Drose et al. |
| 2008/0115014 | A1 | 5/2008 | Vaidyanathan et al. |
| 2008/0133178 | A1 | 6/2008 | Byrne et al. |
| 2008/0140817 | A1 * | 6/2008 | Agarwal et al. ............... 709/223 |
| 2008/0148103 | A1 * | 6/2008 | Carlson et al. .................. 714/38 |
| 2008/0155346 | A1 * | 6/2008 | Britt et al. ....................... 714/43 |
| 2009/0228735 | A1 * | 9/2009 | Ikeda et al. ................... 713/502 |
| 2009/0249128 | A1 * | 10/2009 | Heckman et al. ............... 714/47 |
| 2011/0004419 | A1 | 1/2011 | Ue et al. |
| 2011/0282508 | A1 | 11/2011 | Goutard et al. |

OTHER PUBLICATIONS

Non-Final Office Action for U.S. Appl. No. 13/330,868 mailed Jun. 3, 2013.

* cited by examiner

*Primary Examiner* — Sarai Butler
(74) *Attorney, Agent, or Firm* — Harden E. Stevens, III; Joseph P. Mehrle

(57) ABSTRACT

Disclosed is a fault prediction system and method that uses non-fatal event data received from a terminal to make predictions concerning future fatal faults for the terminal. A complex fault pattern associated with a fault is applied to the non-fatal event data to predict the fault. A corrective action is provided for each predicted fault and historical data is used to predict a time to the predicted fault to govern the type of service response to create to prevent the fault.

30 Claims, 8 Drawing Sheets

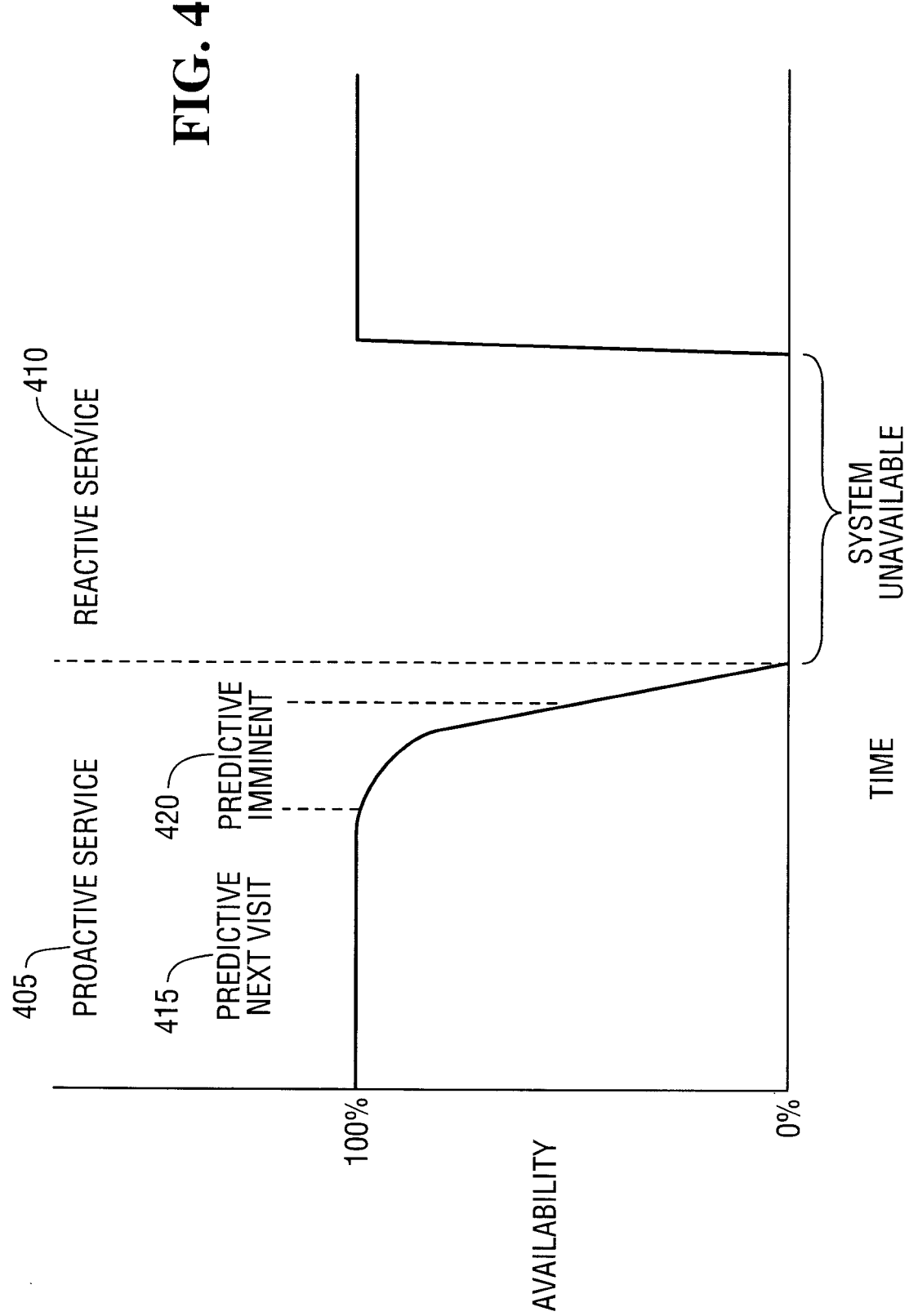

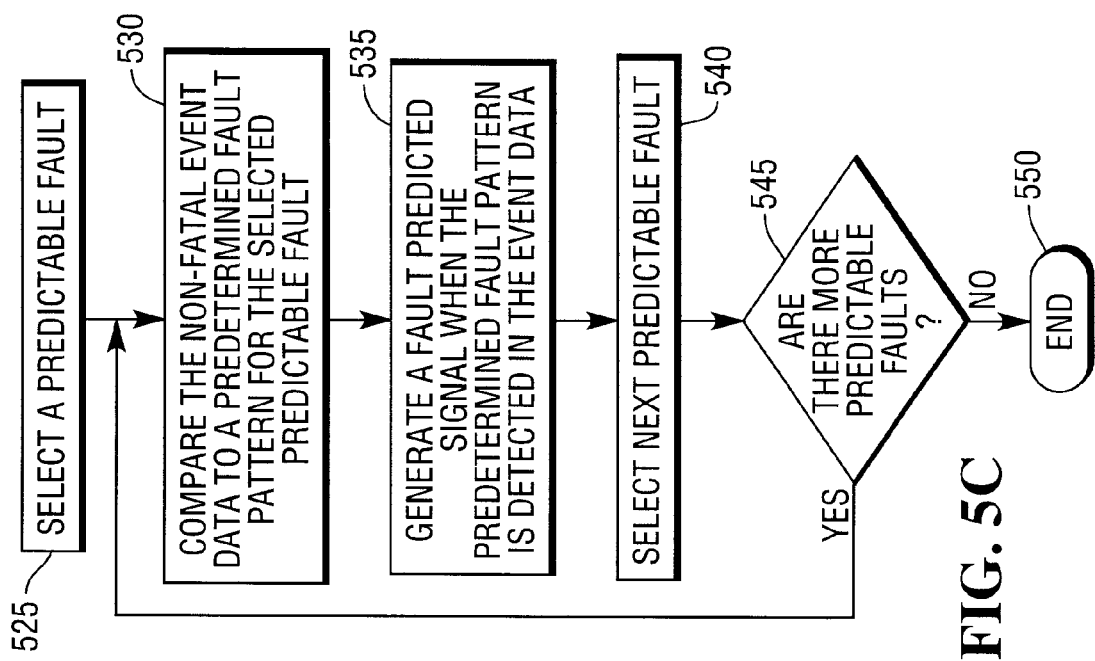
FIG. 5C
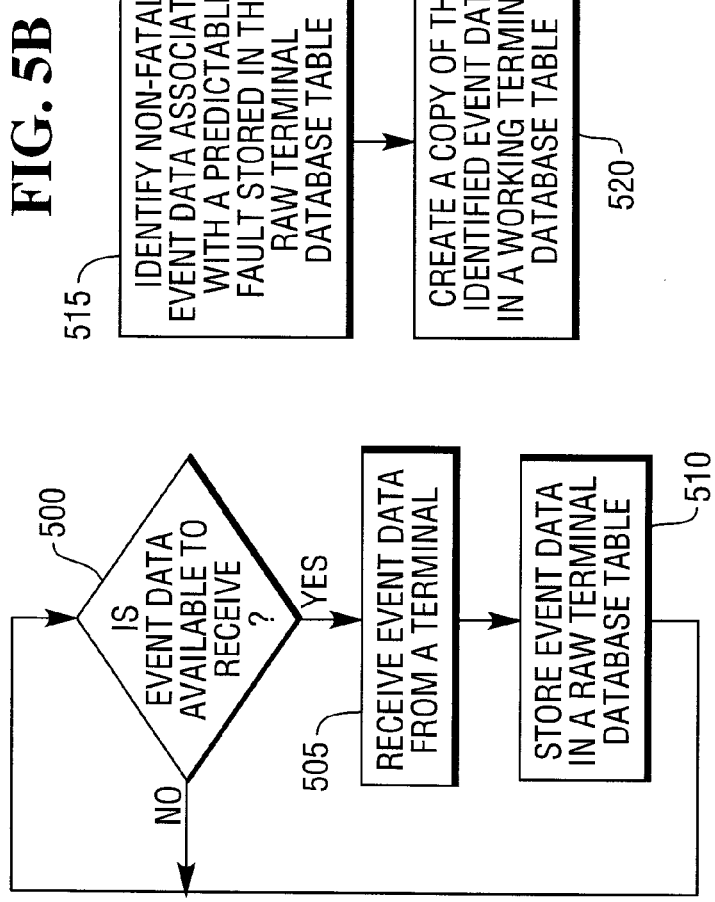
FIG. 5B
FIG. 5A

METHODS AND SYSTEMS FOR PREDICTING A FAULT

RELATED APPLICATION

The present application is related to U.S. patent application Ser. No. 13/330,868, filed on Dec. 20, 2011, concurrently filed with this application and entitled METHODS AND SYSTEMS FOR SCHEDULING A PREDICTED FAULT SERVICE CALL." The present application and the related application are commonly assigned and incorporated herein by reference.

FIELD OF THE INVENTION

The present invention generally relates to a method and system that stores information on a plurality of devices and predicts future device failures enabling corrective actions to be taken prior to a failure.

BACKGROUND

Any discussion of prior art throughout the specification should in no way be considered as an admission that such prior art is widely known or forms part of common general knowledge in the field.

Companies are increasingly relying on self-service terminals to provide their customers with goods or services. In some cases, the self-service terminals replace employee operated terminals or employee provided services. The self-service terminals are typically available for use by customers 24 hours a day and 7 days a week. Examples include automatic teller machines (ATMs), kiosks (e.g., DVD rental, airport and hotel check in, etc.), and self-service point-of-sale terminals.

A customer's level of satisfaction with a company can be directly related to the availability of self-service and assisted service terminals used by the company to provide products and/or services to the customer. Therefore, a failure in one or more of these terminals that renders it unavailable to a customer and result in missed sales, missed opportunities to provide services, lower customer satisfaction and loss of customers.

What is needed is a system that reliably predicts a failure in a self-service or assisted service terminal and enables a corrective action to be taken prior to the failure.

SUMMARY OF THE INVENTION

It is an object of the present invention to overcome or ameliorate at least one of the disadvantages of the prior art, or to provide a useful alternative.

Among its several aspects, one embodiment of the present invention recognizes the need to increase the availability of a terminal by predicting a fatal fault in the terminal and based on the predicted fatal fault, service the terminal to prevent the fault and thus increase the availability of the terminal. Event data is used to predict a fault. Event data is received from one or more terminals and stored in a database. The event data includes events for one or more devices that comprise a terminal. Each predictable fault includes a complex predicted fault pattern that includes two specific fault patterns that apply to a certain type of non-fatal event data associated with a predictable fault for one of the one or more devices. The event data must satisfy the requirements of both of the specific fault patterns before a fault is predicted.

In another embodiment, life limit tally data is used to determine when a device is operating beyond its expected usable life. In this mode of operation, predicted fault patterns are still used to predict a fault; however, the predicted fault patterns are adjusted to detect a fault using lower values for the specific fault patterns.

In accordance with an embodiment of the present invention, a method for predicting a fatal fault in a terminal using non-fatal event data is presented. The method comprises the steps of: receiving a plurality of event data from the terminal where the plurality of event data includes non-fatal event data; identifying non-fatal event data associated with a fault from the plurality of event data; comparing the non-fatal event data to a predetermined fault pattern associated with the fault; and generating a fault predicted signal for the terminal when the predetermined fault pattern is identified within the non-fatal event data.

A more complete understanding of the present invention, as well as further features and advantages of the invention, will be apparent from the following Detailed Description and the accompanying Drawings.

BRIEF DESCRIPTION OF THE DRAWINGS

The aspects of the claimed invention can be better understood with reference to the Drawings and the Detailed Description. The Drawings are not necessarily drawn to scale. Throughout the Drawings, like element numbers are used to describe the same parts throughout the various drawing, figures and charts.

FIG. 4 is a graph illustrating different types of service calls.

FIGS. 5A, 5B and 5C are high-level flow charts illustrating parts of an exemplar method for predicting a fatal fault.

DETAILED DESCRIPTION

In the following description, numerous details are set forth to provide an understanding of the claimed invention. However, it will be understood by those skilled in the art that the claimed invention may be practiced without these details and that numerous variations or modifications from the described embodiments are possible.

Methods and systems are disclosed herein for performing a predictive service. As used herein, a predictive service includes a service provided to a company where a plurality of terminals are monitored, event data from the monitored terminals is received and stored in a database, stored non-fatal event data is analyzed to predict a fatal fault in a terminal, and corrective action is scheduled to occur prior to the failure.

Figure 1:
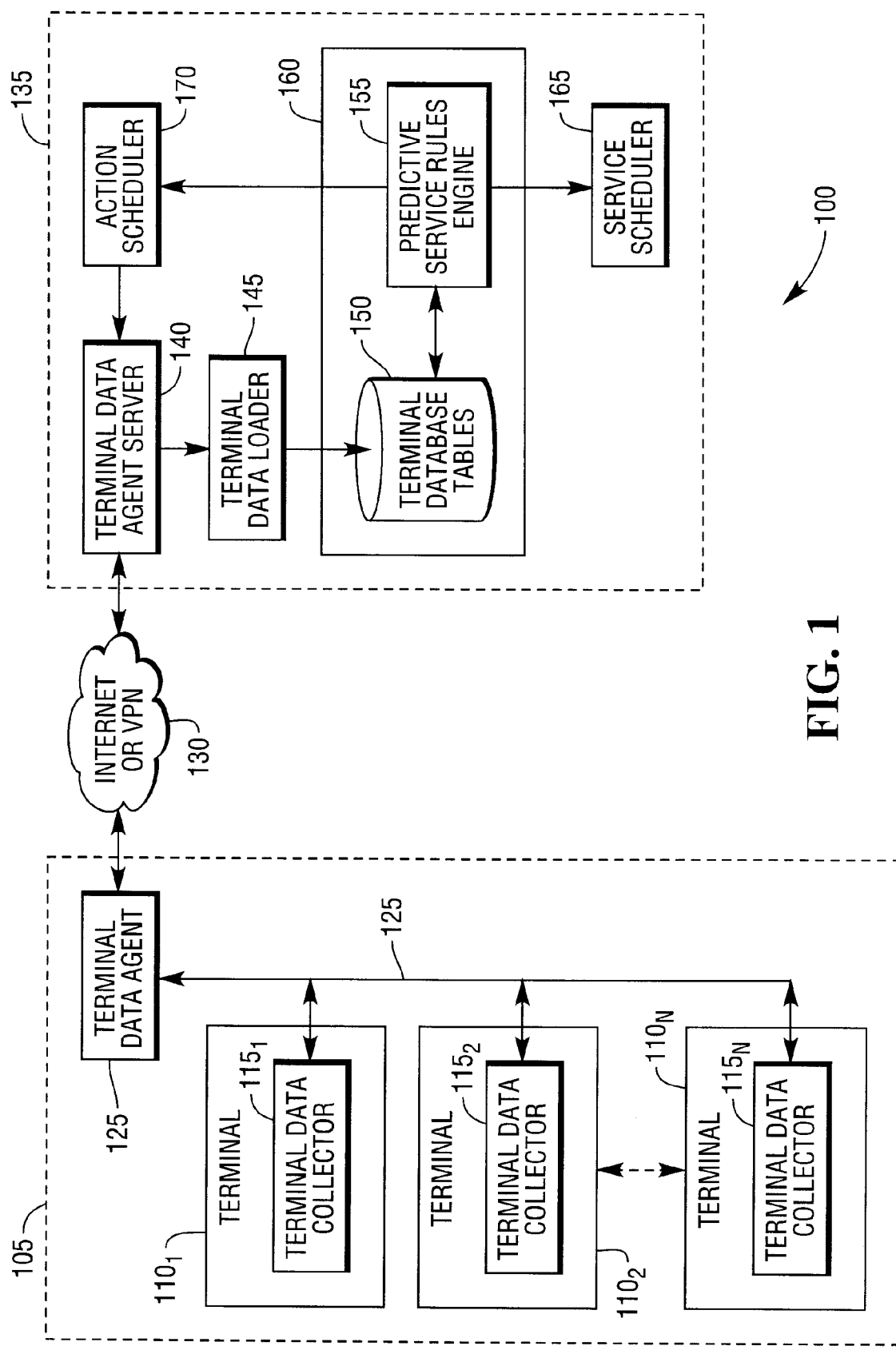
FIG. 1 is a high-level drawing in block form illustrating components of an exemplar embodiment of a predictive services system.

FIG. 1 illustrates one embodiment a data processing system for implementing a predictive service system 100. In this embodiment, a predictive service is provided to a customer where the service monitors a number of remotely located terminals $110_{1-N}$. The terminals $110_{1-N}$ are located at one or more customer locations 105. Each of the terminals $110_{1-N}$ includes a terminal data collector $115_{1-N}$. Each terminal data collector $115_{1-N}$ collects local event data and tally data (if available) and transmits the collected data to a terminal data agent 125. In this embodiment, the terminals $110_{1-N}$ are ATMs. Each ATM terminal includes a magnetic stripe card reader, a currency dispenser and printer. In other embodiments, the terminals $110_{1-N}$ are self-service checkout terminals. In still other embodiments, the terminals $110_{1-N}$ are a combination of different types of terminals where the types of terminals include one or more of: ATMs, assisted checkout terminals, self-service checkout terminals or kiosks.

An event is an action or occurrence that relates to a terminal or a device that is part of the terminal. Each event causes event data to be created that includes information about the event such as the type of event. Events typically relate to failures or abnormal actions. An event can have multiple severity levels however each event is classified as either fatal or non-fatal. A fatal event renders the device or terminal unable to function. Fatal events require immediate attention to correct the failure. A non-fatal event does not render the device or terminal unable to function. A non-fatal event can be a recoverable event or an event that captures operational parameters such as temperature or fan speed. A non-fatal event does not require an action by service personnel. Event data is captured in the terminal by the terminal data collector and transmitted to the terminal data agent 125 as each event occurs. The following are examples of non-fatal terminal events.

1) Card Reader—Read Error
2) Card Reader—Write Error
3) Card Reader—Throat Error
4) Currency Dispenser—Pick Error
5) Currency Dispenser—Jam in Presenter
6) Processor Temperature
7) Cooling fan speed Tally data includes cumulative information about a single parameter related to the terminal. For example, a terminal or device will track the total time the terminal or device is powered and available in a tally. Another tally might track the total number of cycles performed by a device. For example, a card read cycle tally tracks the total number of cards read by a magnetic stripe card reader and a character count tally tracks the total number of characters printed by a printer. Tally data is updated locally as tracked parameters change but tally data is only transmitted to the terminal data agent 125 on a periodic basis. Not all devices or terminals generate tally data. In some embodiments, tally data is transmitted to the terminal data agent 125 once a week.

The terminal data agent 125 receives event and tally data from the terminal data collectors $115_{1-N}$ and transmits the data through a network 130, such as the Internet or a virtual private network, to a terminal data agent server 140. In some embodiments, a copy of the terminal data agent 125 executes on each of the terminals $110_{1-N}$.

A terminal data loader 145 receives the event and tally data from the terminal data agent server 140. The event and tally data is converted to a common format and loaded into a database 160. The database 160 includes a plurality of database tables 150 and a predictive service rules engine 155 ("rules engine"). The rules engine 155 processes the event data and in some cases the tally data stored in the database 160 to determine if a fault event is predicted by the event data, specifically non-fatal event data. The rules engine 155 then determines whether to schedule a service call with a service scheduler 165 or an action with an action scheduler 170 for the terminal having the predicted fault.

Figure 2:
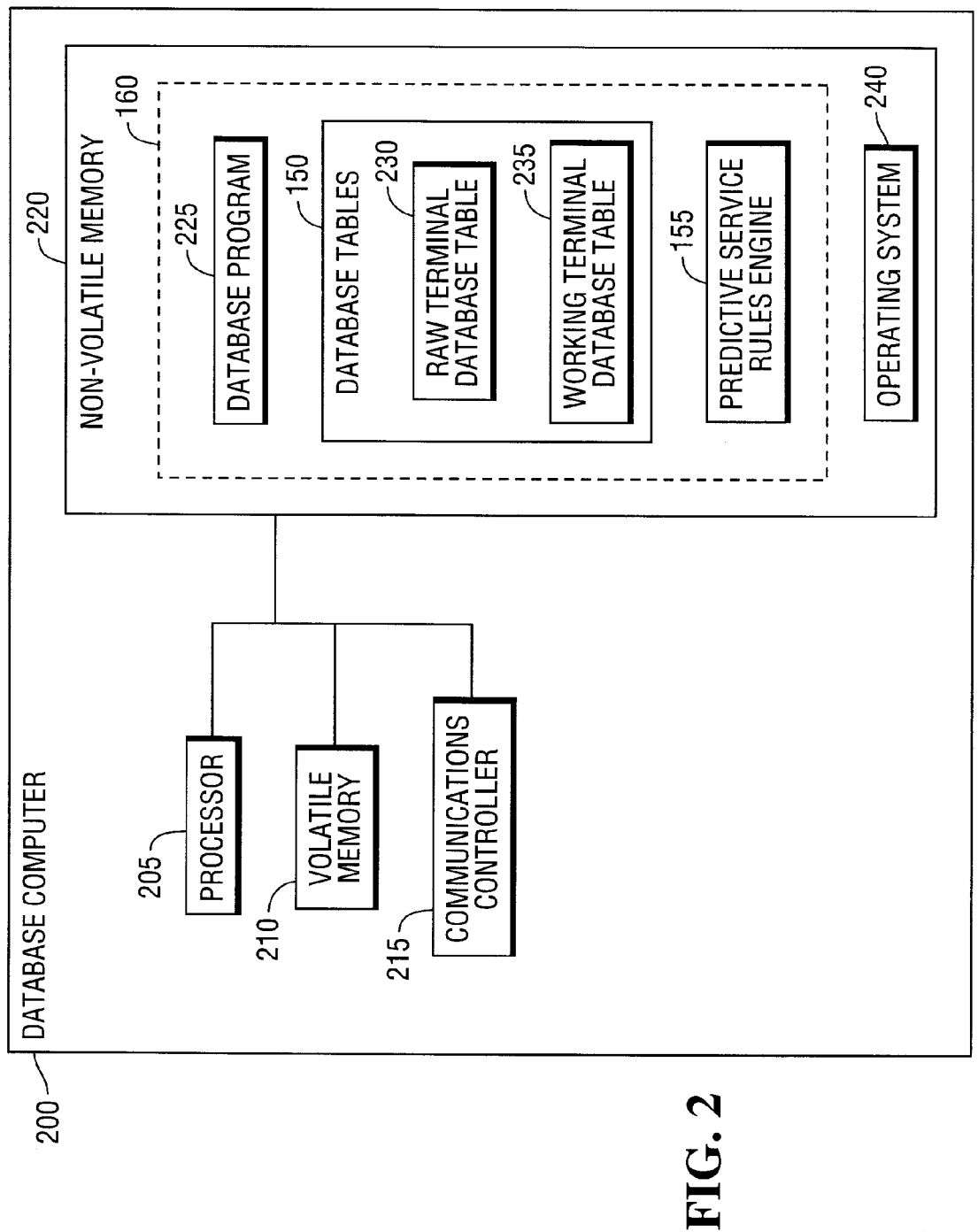
FIG. 2 is a high-level drawing in block form illustrating components of an exemplar embodiment of a database computer server.

Turning to FIG. 2, there is provided a high-level block diagram of a database computer server 200. The server 200 includes a processor 205, a volatile memory 210, a non-volatile memory 220 and a communications controller 215. The non-volatile memory 220 includes an operating system 240 and the database 160. The database 160 includes a database program 225, the database tables 150 and the rules engine 155. The database program 225 includes the software necessary to operate the database 160. The processor 205 executes software that includes the operating system 240 and the database program 225, which causes the processor 205 to control the computer server 200 and implement the features and functions of the database 160. The communications controller 215 communicates with external devices and computers and is controlled by the processor 205 to send and receive data. In some embodiments, some or all of the predictive services software is stored and executed on the server 200.

The database tables 150 include a raw terminal database table 230 and a working terminal database table 235. The terminal data loader 145 creates a record in the raw terminal database table 230 for each event and tally received from each of the terminals $110_{1-N}$. Each record includes information that identifies which terminal generated the event or tally and the event or tally information. When a fatal event is received and stored in the raw terminal database table 230, software, not shown, will process the fatal event and generate an immediate reactive service call.

The predictive service rules engine 155 is implemented as a set of stored procedures stored within the database 160. In some embodiments, the rules engine 155 is implemented as one or more programs external to the database 160 that operate on data stored in the database 160.

In some embodiments, all software components 135 are all implemented on the database computer 200. In other embodiments, the software components 135 are implemented in a multiple computers that also have a processor, a volatile and a non-volatile memory, a communications controller and programs stored in one or both of the memories that are executed by the processor. When the programs are executed by the processor, they cause the processor to perform the functions associated with the components and described herein.

Figure 3A:
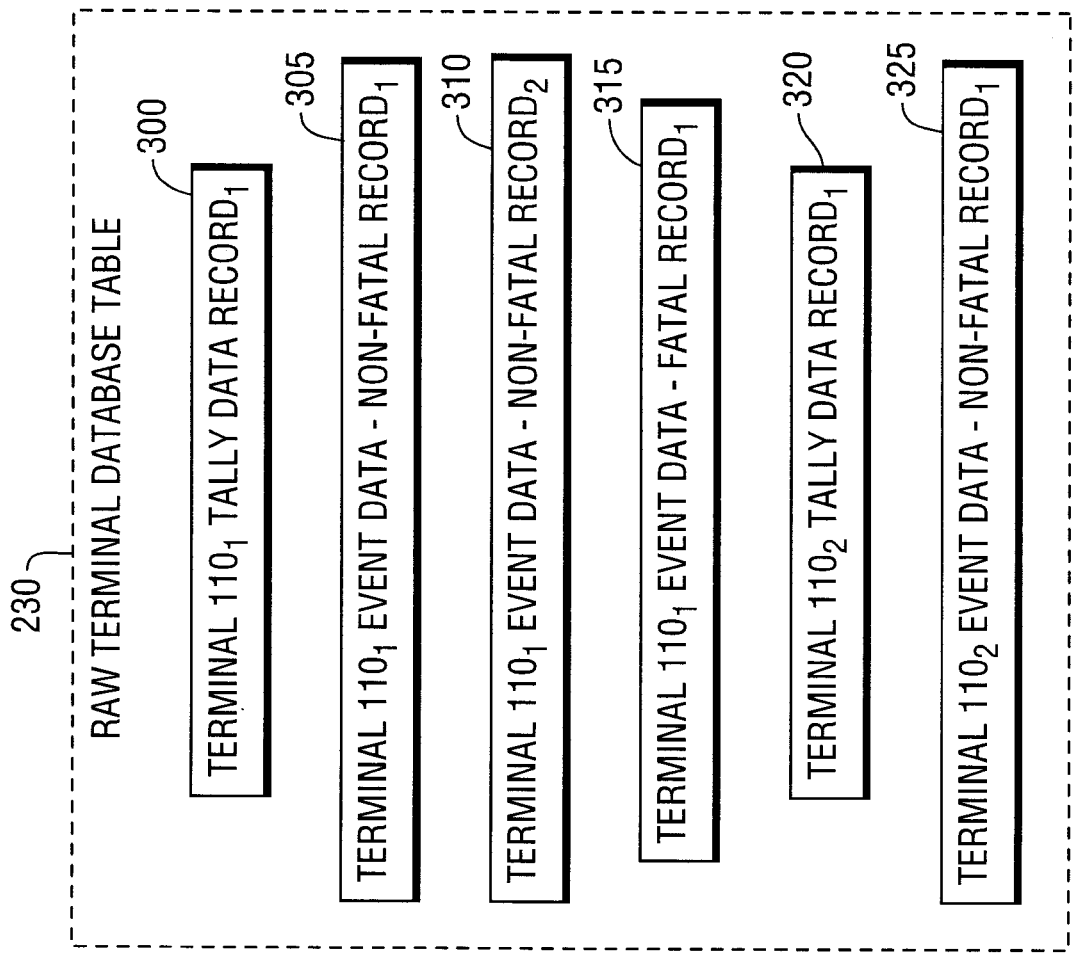
FIG. 3A is a high-level block diagram illustrating an exemplar embodiment of event and tally records stored in a raw terminal database table.

FIG. 3A provides a high-level block diagram illustrating an example of event and tally records stored in the raw terminal database table 230. The terminal data loader 145 creates a record in the raw terminal database table 230 for each event and tally received from a terminal. Each record includes: information that identifies the terminal that generated the event or tally, information that identifies the data as an event or tally, information that identifies the type of event or tally, time and date information related to the event or tally, and any additional data that is part of the event or tally received from the terminal.

The example shown in FIG. 3A depicts 6 records 300-325 stored in the raw terminal database table 230 that were received from two terminals $110_{1-2}$. From the first terminal $110_1$, the terminal data loader 145 has loaded a tally data record$_1$ 300, two non-fatal event data records$_{1-2}$ 305,310 and a fatal event data record$_1$ 315. From the second terminal $110_2$, the terminal data loader 145 has loaded a tally data record$_1$ 320 and a non-fatal event data record$_1$ 325.

Approximately every 5 minutes, the rules engine 155 processes the data records 300-325 stored in the raw terminal database table 230 and identifies records 300,305,310,320, 325 that meet specific criteria. The identified records 300, 305,310,320,325, if not already in the working terminal database table 235, are copied to the working terminal database table 235. The rules engine 155 only identifies events that are classified as non-fatal events and only event types that are required to predict one or more of a plurality of predictable faults. (As used herein, a predictable fault is a fault that causes a device or terminal to fail and to be unavailable for use.) The rules engine 155 can identify multiple faults, sometimes for the same device. The rules engine 155 has rules identifying each fault and the type of event data required to predict the fault. One feature of this invention is the ability to predict fatal faults using only non-fatal event data.

In some embodiments, the rules engine 155 will identify tally data and move it to the working terminal database table 235. The rules engine 155 uses the tally data with event data to predict a fault.

Figure 3B:
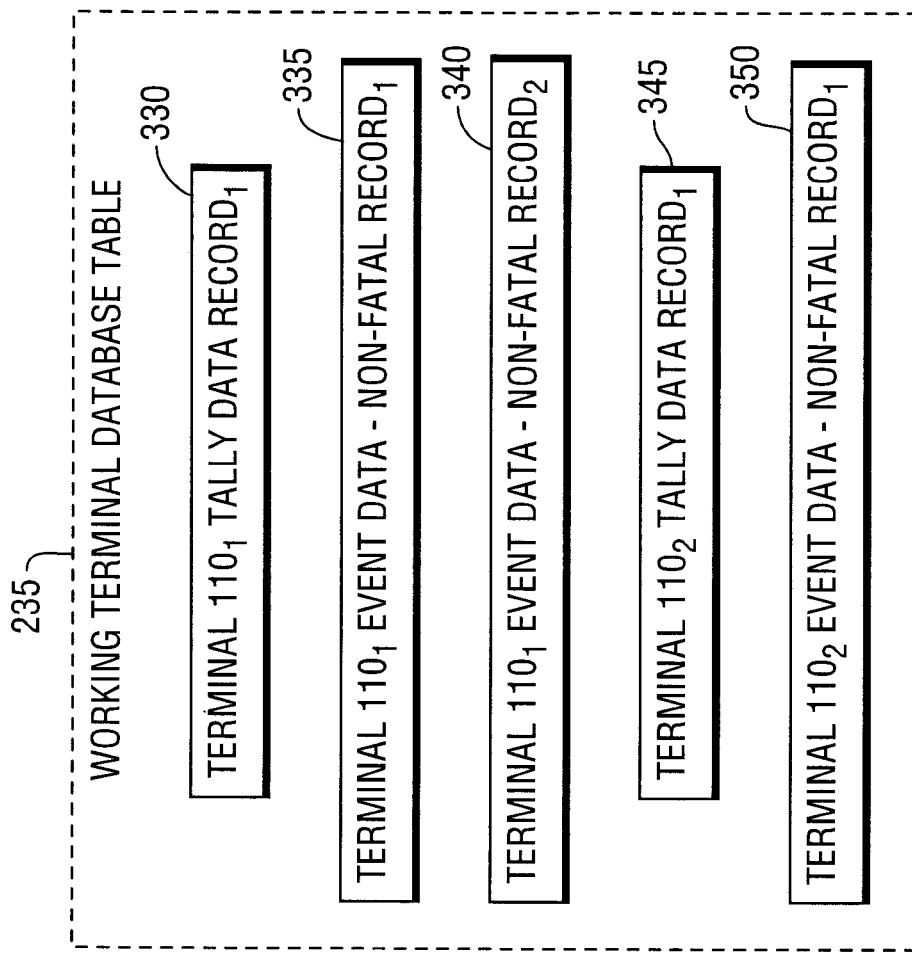
FIG. 3B is a high-level block diagram illustrating an exemplar embodiment of certain event and tally records stored in a working terminal database table.

FIG. 3B provides a high-level block diagram illustrating an example of records stored in the working terminal database table 235. As described above, the rules engine 155 identified and copied certain records 300, 305, 310, 320, 325 from the raw terminal database table 230 to records 330-350 in the working terminal database table 235. Only tally and event data needed to predict a fault are copied to the working terminal database table 235.

Approximately every 15 minutes, the rules engine 155 processes the records 330-350 stored in the working terminal database table 235 to determine if one or more faults can be predicted. The rules engine 155 includes a fault rule for each type of fault that can be predicted. A terminal, or device that is part of the terminal, can experience different types of faults and the rules engine 155 has fault rules for each type of fault that can be predicted. Each fault rule includes a complex fault pattern associated with a specific fault. The fault pattern is based on using non-fatal event data associated with the specific fault. A fault pattern includes information that defines two event patterns. If current data satisfies requirements for both event patterns, a fault is predicted. The first event pattern requires determining that during a predetermined period of time, a predetermined number of non-fatal events of a certain type have occurred. The second event pattern requires determining that the first event pattern has been repeated a predetermined number of times. The predetermined parameters can be different for each fault pattern and are based on historical data for a similar device and terminal.

For example, the failure of a magnetic stripe card reader in an ATM terminal can be predicted by using non-fatal write error events generated by the magnetic stripe card reader in the ATM terminal. The first event pattern in the fault pattern used to predict this failure requires determining that 6 non-fatal write error events occur within a 24 hour period. The second event pattern requires that the first event pattern be repeated 4 times. Put another way, over 4 consecutive 24 hour periods, the number of non-fatal write error events for the magnetic stripe card reader must be 6 or more for each 24 hour period.

A single device can have multiple fault patterns where each fault pattern uses a different event type to predict a fault. For example, another fault pattern for the same magnetic strip card reader is based on read error events instead of write error events. This fault pattern requires determining that 4 non-fatal read error events occur within a 24 hour period and that this pattern is repeated 3 times.

The rules engine 155 processes every fault rule for every fault that can be predicted every 15 minutes. The processing includes selecting the appropriate records from the working terminal database table 235 for each fault rule and determining if the actual event data matches the fault patterns in each fault rule being processed. For example, when the rules engine 155 is processing a fault rule for a magnetic stripe card reader in an ATM terminal that uses write error events, the rules engine 155 will select, in turn, just records with the write error events for each magnetic stripe card reader in each ATM terminal and apply the associated fault patterns to the selected write error events. If a match is found, the rules engine 155 generates a predicted fault signal for the magnetic stripe card reader that generated the event data.

The predicted fault signal includes information associated with the predicted fault such as an fault identifier, a predicted time to failure, service advice that includes either a service to be performed by service personnel or a part or parts to replace or both, device or terminal identification or both, a type of action to take, and a location if known. Some of information stored in the predicted fault signal is taken from the fault rule used to predict the fault and some of the information is taken from the event data used to predict the fault.

In some embodiments, a device has a defined operational life limit parameter. A life limit parameter is designed to predict how long a device can be expected to operate before it fails from normal operation. Life limit data is usually stored in tally data. For a printer, a typical life limit parameter is based on a maximum number of printed characters. Each make and model printer will have a printed character life limit value. When the total number of characters printed by the printer reaches its life limit value, the printer is considered to be worn out and it is typically replaced. However, life limit values are usually set so that statistically a large majority of the devices will fail only after reaching their life limit value. This allows the device to be identified and replaced prior to failure. However, since most of the devices are replaced prior to failure, statistically a large portion of these devices have additional useful life that is lost.

These embodiments allow these devices to be reliably used beyond their operational life limits by combining life limit tally data with corresponding non-fatal event data to predict an actual failure. The rules engine 155 has additional fault rules where the associated fault pattern includes a third pattern. The third pattern determines if tally data for a life limit parameter for a device exceeds a predetermined life limit value. It should be understood that the tally data is not used to, and does not, predict a fault. The tally data is used only to determine when to modify predetermined event data thresholds. If the life limit, as defined in the third pattern, is not exceeded, the first and second event patterns of the fault pattern are applied as taught above. However, if the life limit value is exceeded, the predetermined parameters used in the first and second event patterns are adjusted lower and the patterns are applied to the event data using the adjusted predetermined parameters. The predetermined parameters are lowered after a life limit value is reached because the device is now expected to fail soon and lower indications of a failure are use to predict a fault and generate a predicted fault signal.

After the rules engine 155 generates a predicted fault signal, information stored in the predicted fault signal is used to determine whether to send the predicted fault signal to the service scheduler 165 or to the action scheduler 170.

In some cases, it is possible to issue a direct action to the terminal that is predicted to experience the fault and prevent the fault. This is referred to as self-healing. An example of an action request is to issue a reset command to a terminal. In another example, an action request would cause a terminal to execute a series of commands. If the rules engine 155 determines that an action request is required, it sends the predicted fault signal to the action scheduler 170. The action scheduler 170 creates an action request and communicates with the terminal data agent server 140 to deliver the action request to the proper terminal where the requested action is executed.

The rules engine 155 will generate a predictive service call request based on information in the fault rule. The fault rule includes information that identifies a service call type, a first service time period, predictive part service advice data and predictive part replacement advice data that is included in the predictive service call request. The rules engine 155 sends the predictive service call request to a service scheduler 165 to process.

With reference to FIG. 4, there is provided a graph illustrating different types of service calls. The service scheduler 165 receives different types of service call requests and schedules service calls. Some of the service requests are reactive in nature. Reactive service requests can be generated by automatically detecting a fatal event in a customer's terminal or by a customer calling in a service call request after a terminal fails. A reactive service request causes a reactive service call 410 to be scheduled as soon as possible or within the service window required by a contract with the customer.

The service scheduler 165 also handles predictive service call requests. There are two types of predictive service calls 405. The two types are predictive next visit 415 and predictive imminent 420. Historical data is used to predict the time to fault which is the time between fault prediction and the actual fault. The time to fault can be in hours, days or weeks depending on the type of predicted fault. The time to fault is stored in the fault rule as the first service time period and is included in the predictive service call request. When the service scheduler 165 receives a predictive service call request, it will create a predictive imminent service call 420 if the first service time period is 24 hours or less. If the first service time period is more than 24 hours, a predictive next visit service call 425 is created. Creating a predictive next visit service call does not cause an actual service call to a location to be scheduled. Creating a predictive imminent service call does cause an actual service call to be scheduled.

The service scheduler 165 maintains different types of records including a scheduled service call type and a non-scheduled service call type. A scheduled service call record includes information about a service call that has been scheduled to occur to address an issue. A non-scheduled service call record includes the information needed to schedule a service call however no service call is scheduled when the record is created. A non-scheduled service call includes information that will delay the scheduling of a service call until a future time. When the future time is reached, the service scheduler 165 takes the following actions: the service call information in the non-scheduled service call is used to schedule a service call, a scheduled service call type record is created, and the non-scheduled service call record is deleted. A predictive next visit service call is a type of non-scheduled service call. Predictive imminent service calls and reactive service calls are types of scheduled service calls.

The service scheduler 165 calculates a predicted failure time by adding the first service time period to the current time and date. This time is stored in both types of the predictive service calls. The service scheduler 165 will convert a predictive next visit service call to a predictive imminent service call if the current time and the predicted failure time are less than 24 hours apart.

When the service scheduler 165 receives a reactive service request to a location, it checks all predictive service calls (non-scheduled service calls) to determine if any of the calls are for the same location as the reactive service request. If there are one or more predictive service calls for the same location, the one or more predictive calls are combined with the reactive service call and a single service call is scheduled.

A fault rule also includes information concerning the service to perform and/or the part to replace during a predictive service call that results from a fault predicted by the fault rule. This information is required because the predicted fault has not occurred and field service personnel may not be able to determine what service to perform or what part to replace. This information is included in the service notice as predictive service advice or predictive parts advice. In some embodiments, when a part is predicted to fail, a replacement part is ordered so it is available prior to the service call.

In some embodiments, historical terminal event data is periodically updated with current terminal event data and the fault pattern in each fault rule is tested against the updated historical terminal event data to determine their predictive accuracy. Their predictive accuracy is the fault pattern's ability to predict the related fault. If the predictive accuracy for any fault pattern falls below a minimum accuracy level or below a prior tested accuracy, one or more of the predetermined parameters used in the fault pattern is adjusted and the fault pattern is retested. The adjusting of predetermined parameters and retesting continues until either the accuracy improves or the possible adjustments have been tested. If the accuracy improves, the adjusted predetermined parameters are used in the fault pattern. If the accuracy does not improve, a notice is generated to alert personnel responsible for operating the system. In some embodiments, the updating of terminal event data and the testing of the fault patterns are performed automatically without human intervention and in real-time or near real-time. In such embodiments, an automatic feedback loop is established to constantly update and/or refine the fault patterns.

Turning to FIG. 5A, there is provided a high-level flow chart illustrating a part of a method for predicting a fault. In steps 500-505, the terminal data loader 145 constantly receive event data from a terminal 110₁ and store the event data in the raw terminal database table 230. A poll driven process is depicted to better illustrate the process but it could be interrupt driven for better performance. In step 500, a check is made to determine if event data is available to receive. The event data is received over a network by the terminal data agent server 140. If no data is available, control passes back to step 500 to check again. If event data is available, control is passed to step 505. In step 505, the event data from the terminal 110₁ is received. In step 510, the received event data is stored in the raw terminal database table 230 and control passes back to step 500. In some embodiments, tally data is also received from the terminal 110₁ and stored in the raw terminal database table 230.

FIG. 5B provides a high-level flow chart illustrating a portion of a method for predicting a fault. Steps 515-550 are performed by the rules engine 155. In step 515, all non-fatal event data stored in the raw terminal database table 230 and associated with a predictable fault is identified. There are multiple predictable faults and each fault can have a plurality of event data associated with it. In step 520, the identified event data is copied to the working terminal database table 235. If one or more of the plurality of event data has already been copied to the working terminal database table 235, no additional copies are made. The steps illustrated in FIG. 5B are executed periodically. In some embodiments, the steps are executed every 5 minutes. Data stored in the working terminal database 235 table is purged when the data reaches a certain age to improve the performance of the database.

FIG. 5C provides a high-level flow chart illustrating a portion of a method for predicting a fault. In step 525, a predictable fault is selected. There are a plurality of predictable faults. In step 530, non-fatal event data associated with the selected predictable fault is compared to a predetermined fault pattern for the selected predictable fault. The predetermined fault pattern is a complex fault pattern that includes at least two event patterns that must each be satisfied to predict the fault. The first event pattern requires determining that during a predetermined period of time, a predetermined number of non-fatal events of a certain type have occurred. The second event pattern requires determining that the first event pattern is repeated a predetermined number of times. The predetermined values can be different for each predictable fault. Each predetermined value is stored in the predetermined fault pattern for the predictable fault.

In step 535, a fault predicted signal is generated when the predetermined fault pattern is detected in the event data associated with the fault. The fault predicted signal includes information about the fault, the type of service action needed to prevent the fault and advice or actions to take. In step 540, a next predictable fault is selected if there is one. In step 545, if there is a next predictable fault, control passes to step 530 and if not control passes to step 550 where execution ends. Steps 530 through 545 are repeated until all predictable faults have been processed. Steps 525-550 are executed periodically by the rules engine 155. In some embodiments, steps 525-550 are executed every 15 minutes.

Figure 6:
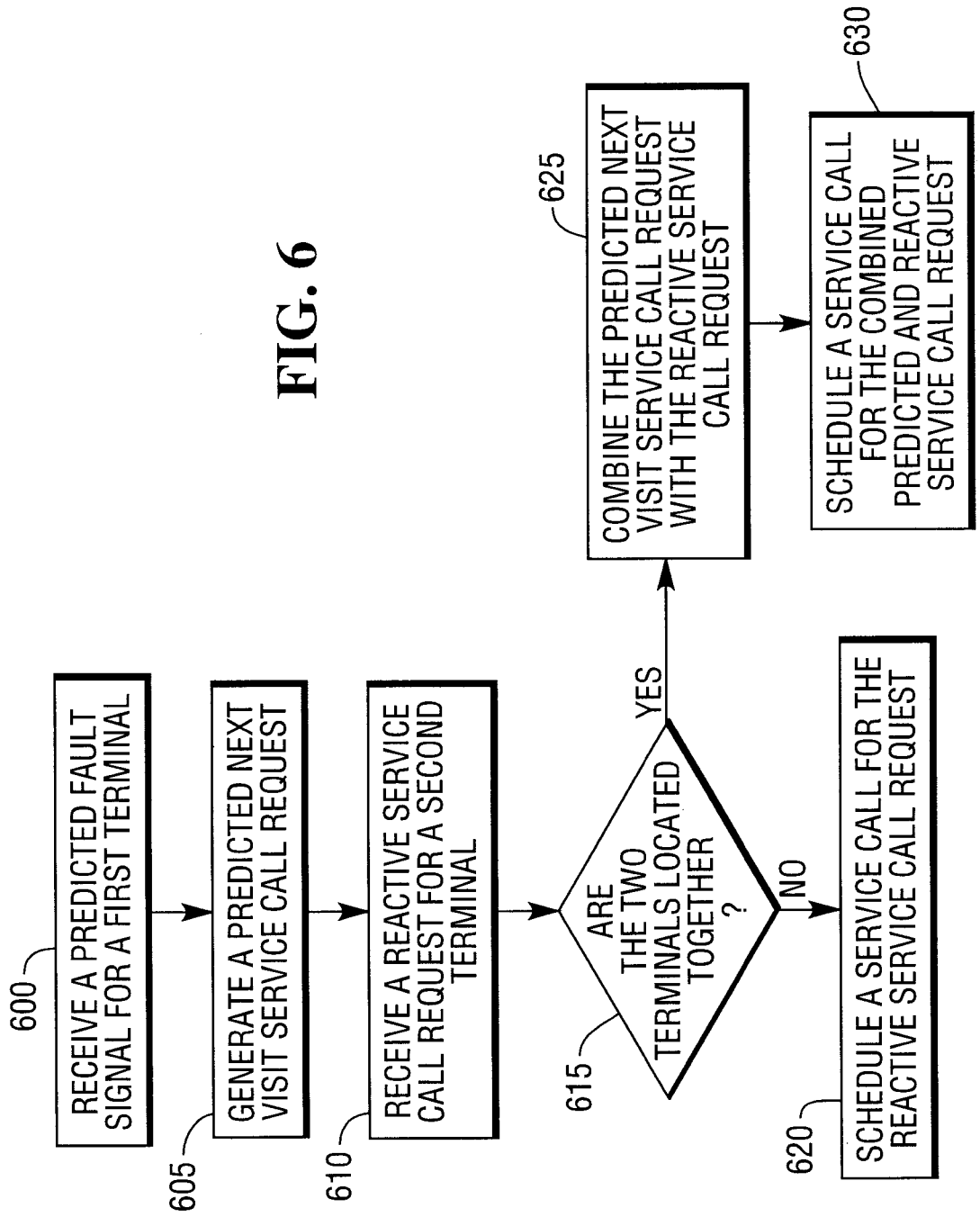
FIG. 6 is a high-level flow chart illustrating an exemplar method for scheduling a predictive service call.

FIG. 6 is a high-level flow chart illustrating an exemplar method for scheduling a predictive service call. A service call involves one or more trained persons traveling to a location to perform a service on something that is in need of service. The type of service performed can vary from performing a specific service to replacing a component. In this example, a retail company has a number of terminals such as ATMs, kiosks and point of sale terminals and contracts with a service company to provide service for the terminals. When a terminal fails, a service call is scheduled to fix the cause of the failure. This type of service call is a reactive service call because it is a reaction to a failure. A service contract with the retail company specifies a service window during which time the service company must have a service person on site to fix the problem after the problem is reported. Another type of service call is a predictive service call. A predictive service call is generated as a result of predicting a fault that has not yet occurred. Unlike a reactive service call, the scheduling of an actual service call for a predictive service call can be delayed for period of time. During the delay period, if another terminal fails at the same location as the predicted fault, the reactive service call is combined with the predictive service call. This reduces the number of trips that are made to the location and still prevents the predicted fault from occurring.

In step 600, a predicted fault signal is received for a first terminal. The predicted fault signal includes information about the predicted fault. In step 605, a predicted next visit service call request is generated. This type of service call does not cause an actual service call to be scheduled but does create a record about the predictive service call. In step 610, a reactive service call request is received for a second terminal at the same location as the first terminal. In step 615, the locations of the first and second terminals are compared. If the locations are the same, control is passed to step 625. If the locations are not the same, control is passed to step 620. In step 620, a service call is scheduled in response to the reactive service call request. In step 625, the predicted next visit service call request is combined with the reactive service call request. In step 630, a service call is scheduled to service the combined service call requests.

Figure 7:
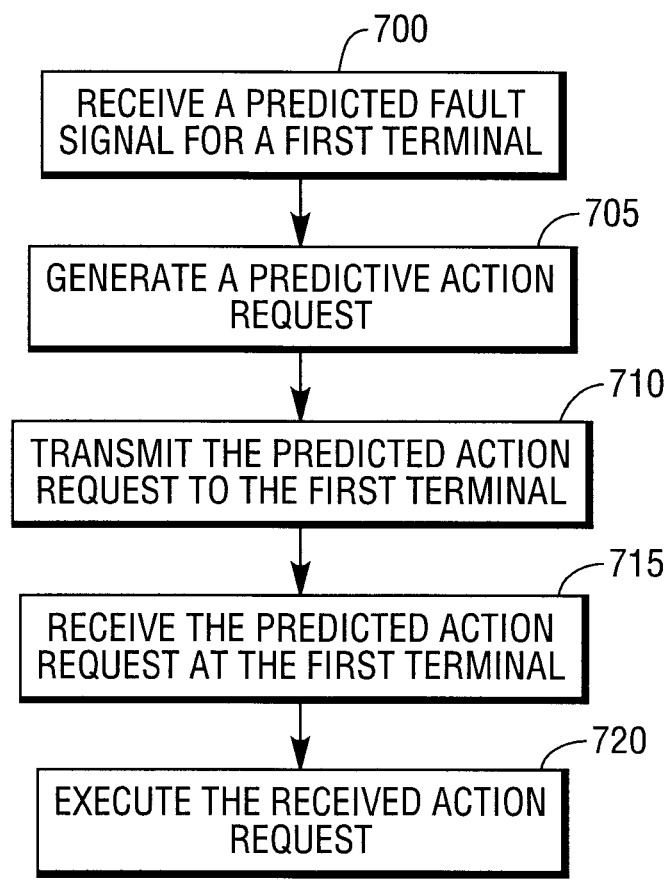
FIG. 7 is a high-level flow chart illustrating an exemplar method for scheduling a predicted action.

FIG. 7 provides a high-level flow chart illustrating an exemplar method for scheduling a predicted action. The predicted fault signal includes information that specifies whether a predictive service call should be performed or a predicted action should be performed. In this example, a predicted action is performed as result of a predicted fault. A predicted action includes one or more commands that are sent to a terminal and executed by the terminal to resolve the predicted fault.

In step 700, a predicted fault signal is received for a first terminal. The predicted fault signal specifies that a predicted action should be performed. In step 705, a predicted action request is generated in response to receiving the predicted fault signal. The predicted action request includes the one or more commands to be executed by the first terminal. In step 710, the predicted action request is transmitted to the first terminal. In step 715, the first terminal receives the predicted action request. In step 720, the first terminal executes the one or more commands included in the received action request.

Although particular reference has been made to an embodiment that includes a predicted service database and examples have been provided illustrating the invention in combination with ATM terminals and point of sale terminals, certain other embodiments, variations, and modifications are also envisioned within the spirit and scope of the following claims. For example, there are embodiments where the invention includes kiosk terminals, airport check in terminals, hotel check in terminals, and computers.

We claim:

1. A method for predicting a fault in a self-service or assisted service terminal comprising:
   receiving event data associated with a terminal;
   selecting event data relevant to a fault pattern associated with a predictable fault;
   comparing the selected event data to the fault pattern associated with the predictable fault, wherein the fault pattern is based at least in part on historical event data and the fault pattern includes information that defines two event patterns, a first event pattern identifying that within a predetermined period of time a certain number of non-fatal events of a certain type have been detected, and a second event pattern determines that the first event pattern has been repeated a predetermined number of times; and
   predicting a fault for the terminal in an instance in which the selected event data matches the fault pattern.

2. The method of claim 1, further comprising:
   updating the historical event data with the received event data; and
   modifying the fault pattern based at least in part on the updated historical event data.

3. The method of claim 1, wherein the fault pattern defines a frequency condition that is met when a specified event occurs a first specified number of times within a specified time duration, and wherein predicting the fault further comprises determining that the event data indicates that the specified event has occurred at least the first specified number of times within the specified time duration.

4. The method of claim 3, wherein the fault pattern defines a recurrence condition that is met when the frequency condition is repeated a second specified number of times, and wherein predicting the fault further comprises determining that the event data indicates that the frequency condition has been repeated the second specified number of times.

5. The method of claim 1, wherein comparing the event data to a fault pattern further comprises comparing the event data to each of a plurality of fault patterns, and wherein predicting a fault further comprises predicting a fault for each fault pattern that the event data matches.

6. The method of claim 1, further comprising:
generating a signal identifying the predicted fault.

7. The method of claim 6, wherein the signal comprises an indication of a predicted time until the predicted fault occurs.

8. The method of claim 1, wherein historical event data comprises event data generated prior to the received event data.

9. The method of claim 1, further comprising:
generating a request to schedule a service call related to the predicted fault.

10. The method of claim 1, further comprising:
generating a request to perform an action to prevent the predicted fault.

11. The method of claim 1, further comprising:
receiving tally data indicating a number of times a particular event associated with a component of the terminal has occurred during the life of the component;
determining that the number exceeds an expected number of times the particular event should occur prior to failure of the component; and
adjusting the fault pattern based at least in part on the determination.

12. The method of claim 1, wherein the terminal performs at least one of the receiving, comparing, and predicting steps.

13. A method for predicting a fault in a self-service or assisted service terminal comprising:
receiving event data associated with a terminal;
identifying a condition that predicts a fault based at least in part on the event data; and
creating a fault pattern representing the condition for predicting the fault and creating the fault pattern with information that defines two event patterns, a first event pattern identifying that within a predetermined period of time a certain number of non-fatal events of a certain type have been detected, and a second event pattern determines that the first event pattern has been repeated a predetermined number of times.

14. The method of claim 13, further comprising:
receiving additional event data associated with the terminal;
updating the event data with the additional event data;
testing the fault pattern using the updated event data; and
modifying the fault pattern based at least in part on the testing.

15. The method of claim 13, wherein receiving event data associated with a terminal further comprises receiving event data associated with at least one additional terminal.

16. The method of claim 15, further comprising:
receiving additional event data associated with the at least one additional terminal;
updating the event data with the additional event data;
testing the fault pattern using the updated event data; and
modifying the fault pattern based at least in part on the testing.

17. The method of claim 13, wherein the terminal performs at least one of the receiving, identifying, and creating steps.

18. The method of claim 13, further comprising:
receiving additional event data associated with the terminal;
comparing the additional event data to the fault pattern; and
predicting a fault for the terminal in an instance in which the additional event data matches the fault pattern.

19. An apparatus for predicting a fault in a self-service or assisted service terminal comprising:
at least one processor; and
at least one memory comprising computer program code, the at least one memory and the computer program code configured to, with the at least one processor, cause the apparatus at least to:
receive event data associated with a terminal;
compare the event data to a fault pattern associated with a predictable fault, wherein the fault pattern is based at least in part on historical event data and the fault pattern includes information that defines two event patterns, a first event pattern identifying that within a predetermined period of time a certain number of non-fatal events of a certain type have been detected, and a second event pattern determines that the first event pattern has been repeated a predetermined number of times; and
predict a fault for a hardware component associated with the terminal in an instance in which the event data matches the fault pattern.

20. The apparatus of claim 19, wherein the at least one memory and the computer program code are further configured to, with the at least one processor, cause the apparatus to:
event data;
update the historical event data with the received event data; and
modify the fault pattern based at least in part on the updated historical event data.

21. The apparatus of claim 19, wherein the fault pattern defines a frequency condition that is met when a specified event occurs a first specified number of times within a specified time duration, and wherein predicting the fault further comprises determining that the event data indicates that the specified event has occurred at least the first specified number of times within the specified time duration.

22. The apparatus of claim 21, wherein the fault pattern defines a recurrence condition that is met when the frequency condition is repeated a second specified number of times, and wherein predicting the fault further comprises determining that the event data indicates that the frequency condition has been repeated the second specified number of times.

23. The apparatus of claim 19, wherein in order to compare the event data to a fault pattern, the at least one memory and the computer program code are further configured to, with the at least one processor, cause the apparatus to compare the event data to each of a plurality of fault patterns; and wherein in order to predict a fault, the at least one memory and the computer program code are further configured to, with the at least one processor, cause the apparatus to predict a fault for each fault pattern that the event data matches.

24. The apparatus of claim 19, wherein the at least one memory and the computer program code are further configured to, with the at least one processor, cause the apparatus to:
generate a signal identifying the predicted fault.

25. The apparatus of claim 24, wherein the signal comprises an indication of a predicted time until the predicted fault occurs.

26. The apparatus of claim 19, wherein historical event data comprises any event data generated prior to the received event data.

27. The apparatus of claim 19, wherein the at least one memory and the computer program code are further configured to, with the at least one processor, cause the apparatus to:
generate a request to schedule a service call related to the predicted fault.

28. The apparatus of claim 19, wherein the at least one memory and the computer program code are further configured to, with the at least one processor, cause the apparatus to:
  generate a request to perform an action to prevent the predicted fault.

29. The apparatus of claim 19, wherein the at least one memory and the computer program code are further configured to, with the at least one processor, cause the apparatus to:
  receive tally data indicating a number of times a particular event associated with a component of the terminal has occurred during the life of the component;
  determine that the number exceeds an expected number of times the particular event should occur prior to failure of the component; and
  adjust the fault pattern based at least in part on the determination.

30. The apparatus of claim 19, wherein the apparatus is the terminal.

* * * * *